United States Patent

Massa

[15] 3,661,492
[45] May 9, 1972

[54] FLASH REMOVAL APPARATUS

[72] Inventor: Charles Donald Massa, Elgin, Ill.

[73] Assignee: American Can Company, New York, N.Y.

[22] Filed: Apr. 22, 1970

[21] Appl. No.: 30,674

[52] U.S. Cl..............................425/307, 83/914, 425/326, 425/98
[51] Int. Cl........................................................B29d 23/03
[58] Field of Search....................18/5 BS, DIG. 55, 18, 51; 264/161; 83/914

[56] References Cited

UNITED STATES PATENTS

| | | | |
|---|---|---|---|
| 2,903,740 | 9/1959 | Parfrey | 18/5 BA |
| 3,770,116 | 8/1966 | Ruekberg | 18/5 BS |
| 3,362,043 | 1/1968 | Langdon et al. | 264/161 X |
| 3,464,084 | 9/1969 | Thompson | 18/DIG. 18 |
| 3,084,390 | 4/1963 | Anderson | 18/DIG. 55 |
| 3,377,899 | 4/1968 | Wolford | 83/914 X |
| 3,458,897 | 8/1969 | Roger | 18/5 BS |
| 3,543,619 | 12/1970 | Hellmer | 18/5 BS |

*Primary Examiner*—J. Spencer Overholser
*Assistant Examiner*—Michael O. Sutton
*Attorney*—Robert P. Auber, George P. Ziehmer and Leonard R. Kohan

[57] ABSTRACT

Apparatus for removing flash material from molded plastic bottles comprises a multi-part die having heated inner die parts insertable into an aperture such as a bottle handle opening and pivoted into a bottle contacting disposition to conform to the contour of the aperture, thereby to soften the flash and press the latter against the surface of the handle. A heated outer die part is also pivoted with the inner die parts into flash removing relation to the bottle to remove flash at the outside of the handle.

12 Claims, 14 Drawing Figures

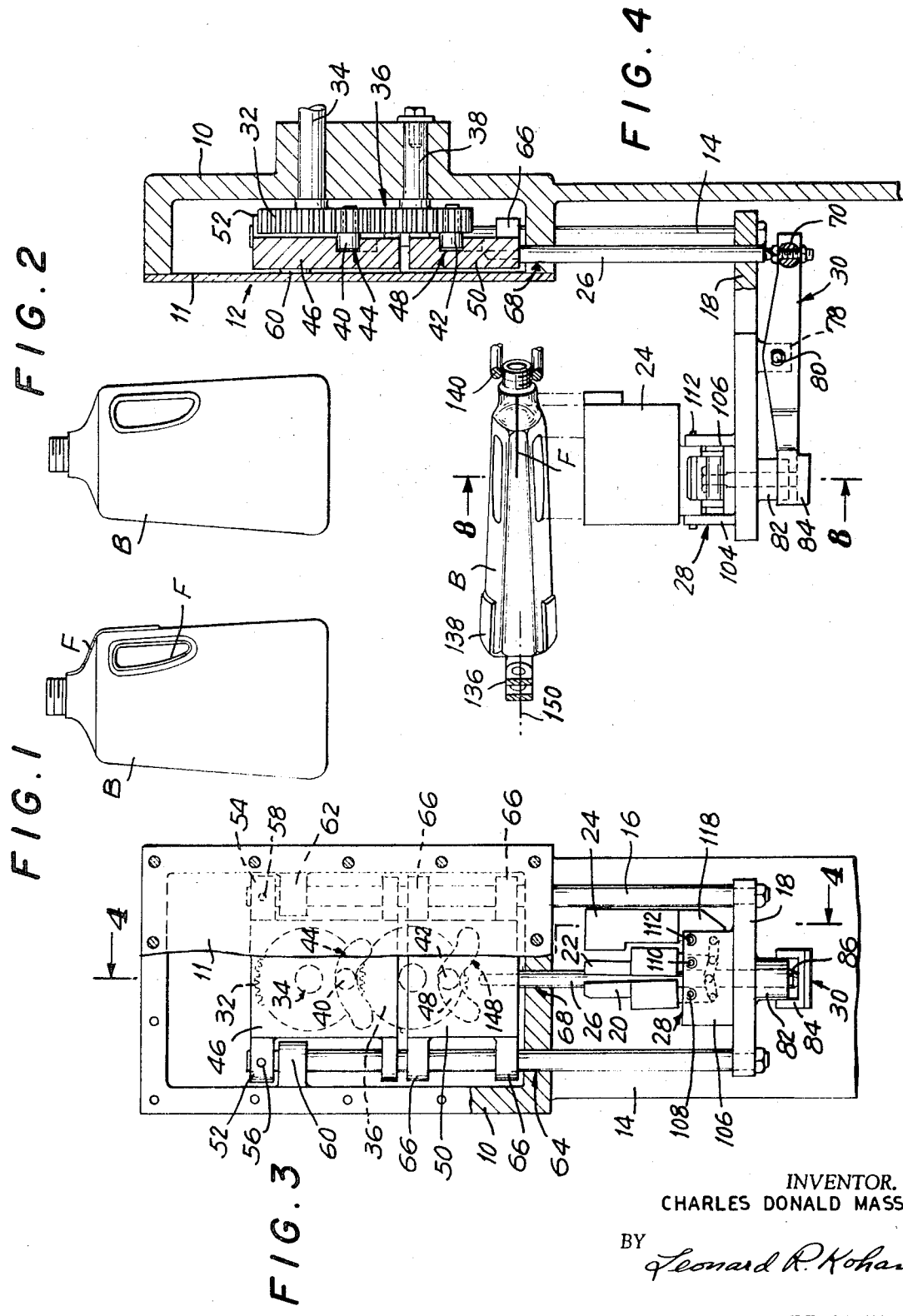

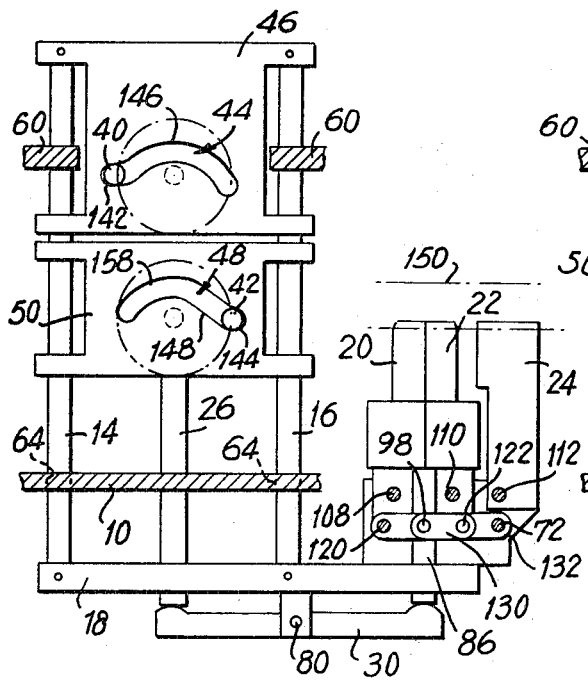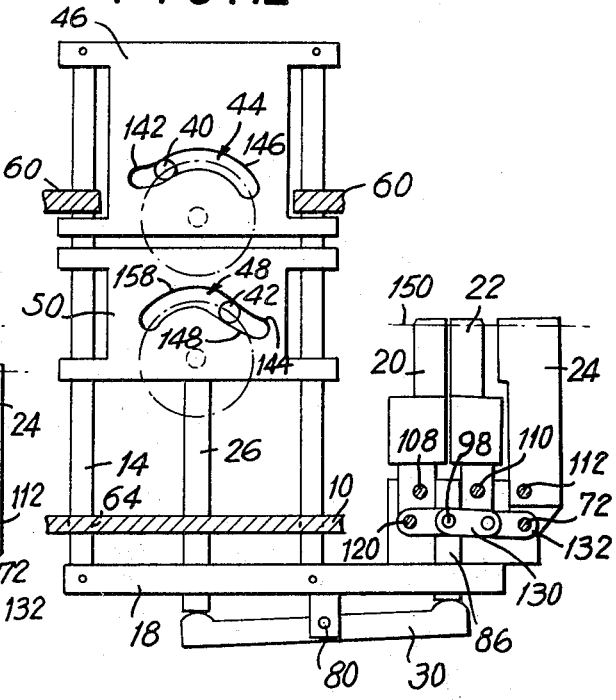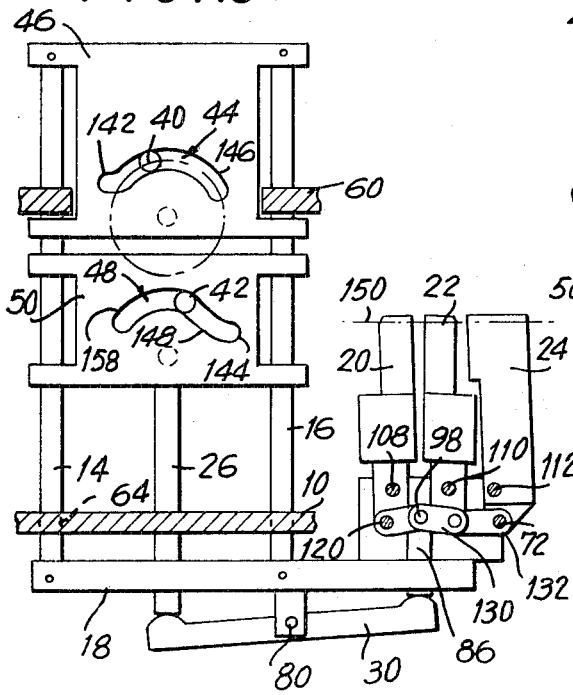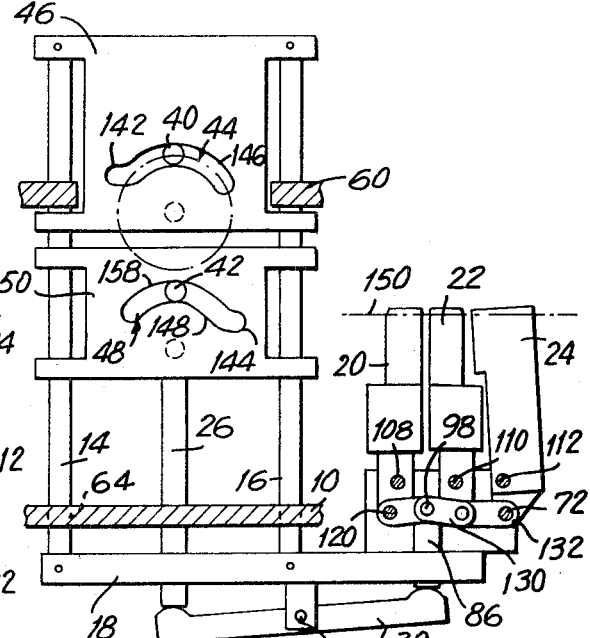

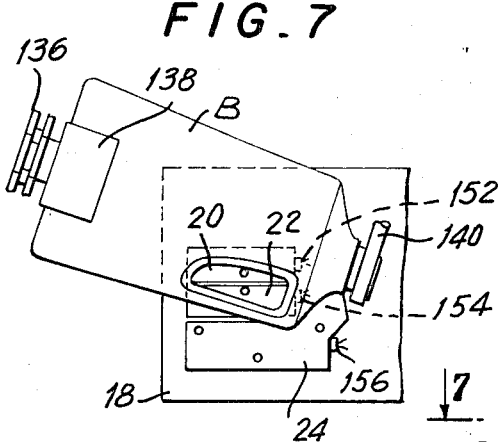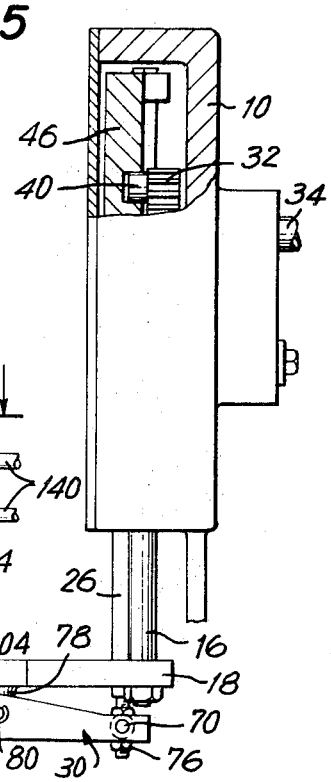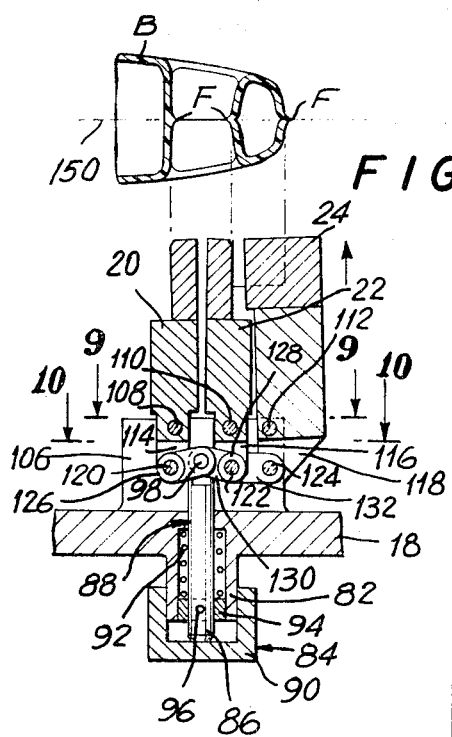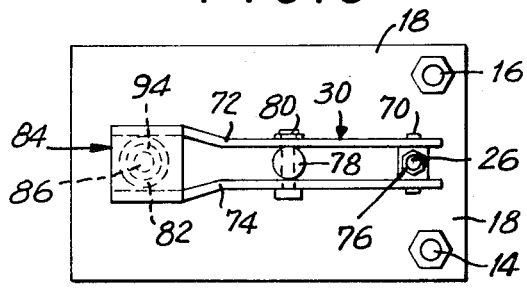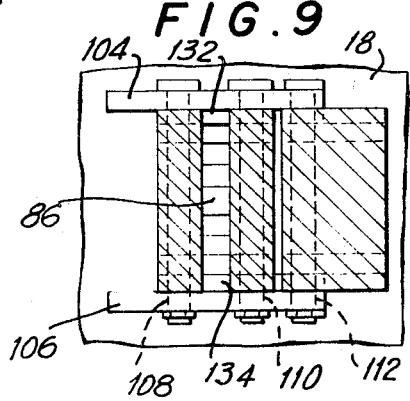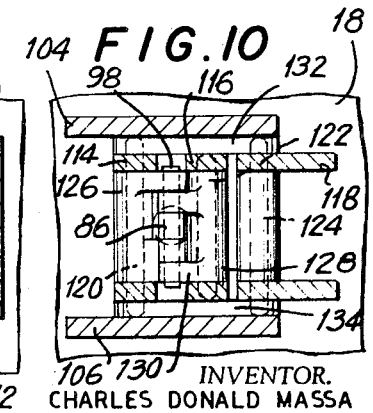

FLASH REMOVAL APPARATUS

BACKGROUND OF THE INVENTION

This invention relates to apparatus for removing flash and the like from a molded plastic article such as a bottle after the latter has been removed from a mold.

One method of molding plastic bottles is carried out by enclosing a parison in a split mold and introducing air under pressure into the split mold to cause the plastic material of the parison to conform to the configuration of the split mold cavity. In the formation of bottle handles, the tubular parison is initially expanded prior to the closing of the mold to ensure that the handle portion of the mold will close upon a portion of the parison. This requires that the closing mold halves grip between them some of the plastic material of the parison, thereby resulting in a web of plastic material within the handle opening at the conclusion of the molding process. In addition, as the mold closes, a certain amount of the plastic material is caught between the closing mold faces in the region of the shoulder, thus resulting in projecting fins on the shoulder of the completed bottle. The projecting fins and the web within the handle opening are referred to generally as flash.

In cases where reciprocating knives and dies are employed to sever the flash from the bottle along the line of juncture of the flash with the bottle, lack of precision of the initial alignment of the bottle with the reciprocating die knife assembly results in the knife cutting either too deeply into the flash, thereby leaving a projecting rib on the bottle, or cutting too deeply into the bottle surface resulting in a weakened spot or even cutting entirely through the relatively thin walled bottle.

Although the flash may be removed manually, bottles of the type under consideration are produced in substantial quantities and such manual removal is not economically feasible.

Accordingly an object of the present invention is to provide an apparatus for removing flash from molded articles which utilizes heated dies to soften or melt the flash and to press it into or flatten it against the surface of the bottle.

Another object is to provide an apparatus utilizing a multipart die having a heated outer die part adapted to be fitted against the outside surface of the handle and heated inner die parts adapted to be inserted in the opening of a bottle handle and spread apart to press the softened flash against the surface of the handle.

A further object is to provide an apparatus utilizing die parts contoured to fit the inside and outside of a bottle handle but which are adapted to be pivoted to a non-bottle contacting disposition to provide clearance so that the die parts do not rub the handle or the flash during the entering and retracting parts of the cycle.

Numerous other objects and advantages of the invention will be apparent as it is better understood from the following description, which, taken in connection with the accompanying drawings, discloses a preferred embodiment thereof.

SUMMARY OF THE INVENTION

Apparatus for removing flash material from portions of molded plastic bottles comprises a platform on which a plurality of die members are pivotally mounted between a first, non-bottle contacting disposition and a second, bottle contacting disposition. Actuating means are operable to displace the platform between a first location out of the path of travel of the bottle as it enters and leaves the deflashing apparatus and a second location wherein the die members may be pivoted into said bottle contacting disposition. The actuating means are also operable to dispose said die members in said first, non-bottle contacting disposition when the platform initially enters said second location and to subsequently pivot said die members into second disposition while the platform is in said second location, whereby said die members in said second disposition are operable to effect flash removal from the bottle.

BRIEF DESCRIPTION OF THE DRAWINGS

FIG. 1 is an elevational view of a molded bottle before the flash has been removed.

FIG. 2 is an elevational view of the same bottle shown in FIG. 1 after the flash has been removed.

FIG. 3 is an elevational view, partly broken away, of apparatus for removing flash from a molded bottle according to one embodiment of the invention.

FIG. 4 is a sectional view taken along the line 4—4 of FIG. 3 and showing the apparatus in a down position.

FIG. 5 is a view similar to FIG. 4 but only partially in section and showing the apparatus in an up position.

FIG. 6 is a partial bottom view of the apparatus shown in FIG. 5 but excluding the bottle and the bottle conveyor.

FIG. 7 is a partial plan view looking generally along the line 7—7 of FIG. 5.

FIG. 8 is a sectional view taken along the line 8—8 in FIG. 4.

FIG. 9 is a sectional view taken along the line 9—9 in FIG. 8.

FIG. 10 is a sectional view taken along the line 10—10 in FIG. 8.

FIG. 11 is a schematic view showing the relative positions of the cams and the heating dies after the latter have completed one-half of their upward stroke.

FIG. 12 is a schematic view similar to FIG. 11 but showing the positions of the parts after the dies have reached the full up position and the collapsible dies within the handle are halfway open.

FIG. 13 is a schematic view similar to FIGS. 11 and 12 but showing the position of the parts after the collapsible dies have been fully opened.

FIG. 14 is a schematic view similar to FIGS. 11 to 13 but showing the position of the parts in the dwell position wherein the dies are in contact with the bottle to effect deflashing.

DESCRIPTION OF THE PREFERRED EMBODIMENTS

Referring to the drawings, FIG. 1 shows a plastic molded article or bottle B having flash F in the form of a fin-like web which projects from the surface of the bottle. Flash is formed in the molding operation by material which is caught between the closing mold halves or forced between the mold halves faces during the molding operation. FIG. 2 shows the same plastic bottle B after the flash F has been removed by the apparatus hereinafter described.

The apparatus for removing the flash comprises a main frame 10 having a cover 11 and housing cam means 12 operable to actuate a pair of rods 14 and 16 (FIG. 3) which raise and lower a platform 18. The platform 18 in turn mounts a pair of inner dies 20, 22 and an outer die 24 which are movable with the platform between a lowered position (FIG. 4) in which the dies 20, 22, 24 are free and clear of the bottle B, and a raised position (FIG. 5) wherein the dies 20, 22, 24 engage the bottle B and remove the flash F. The cam means 12 also actuate another rod 26 which in turn operates a toggle means 28 via a lever 30 pivotally mounted on the platform 18. The toggle means 28 is operable to pivot the dies 20, 22, 24 slightly after the dies have been raised to their up position to bring them into contact with the bottle B to remove the flash. After the flash F has been removed, the reverse cycle is repeated wherein the dies 20, 22, 24 are pivoted to their initial position and lowered out of the path of travel of the bottle ready to repeat the cycle after a new bottle enters the station.

Turning to more specific details of construction, the main frame 10 houses a cam gear 32 fixed to a main shaft 34 which is supported for rotation on the housing 10. The cam gear 32 meshes with an idler gear 36 which is fixed to a stub shaft 38 which is also supported for rotation on the housing 10. The main shaft 34 is adapted to be intermittently operated, by means not shown, to rotate first in one direction for a predetermined number of degrees, for example 180°, and then rotated in an opposite direction a like number of degrees.

The main cam gear 32 carries a cam roller 40 eccentrically mounted relative to the center line of the main shaft 34. Similarly, idler gear 36 carries a cam roller 42 eccentrically mounted relative to the center line of stub shaft 38. The cam roller 40 rides in a cam groove 44 formed within one side of an upper cam plate 46 while cam roller 42 rides in another cam groove 48 formed within one side of a lower cam plate 50. As can best be seen in FIG. 3, the faces of the gears 32, 36 are parallel and disposed closely adjacent to the sides of the respective cam plates 46, 50 so that the cam rollers 40, 42 will be accommodated in the respective cam groove 44, 48. The cam plates 46, 50 are reciprocated up and down by the cam rollers 40, 42 engaging the respective cam groove 44, 48 as the cam gear 32 is rotated back and forth as previously described.

The upper cam plate 46 is provided with a pair of lugs 52, 54 having openings in which the upper end of the rods 14, 16 are received and secured by pins 56, 58 respectively. It will be apparent that since the rods 14, 16 are also secured to the platform 18 that the upper cam plate 46, rods 14, 16 and platform 18 will reciprocate as a unit. The rods 14, 16 are slidably supported on the main frame 10 by means of frame lugs 60, 62 and the openings (e.g. opening 64 shown in FIG. 3) in the bottom of the frame 10 through which the rods 14, 16 pass out of the frame housing.

The lower cam plate 50 is slidably mounted on the rods 14, 16 and to this end the lower cam plate 50 is provided with lugs 66 having openings slidably receiving the rods 14 and 16. The lower cam plate 50 has secured to its lower end the previously mentioned rod 26, the latter in turn passing out from the housing of the main frame 10 through the opening 68. The lower end of the rod 26 is pivotally connected to one end of the lever 30, the pivot connection being effected by a short shaft 70 rotatably supported in two spaced upright members 72, 74, as best shown in FIG. 6, which form lever 30. The shaft 70 has a diametrical opening in which the end portion of the rod 26 is received, the end of the rod 26 passing completely through the opening in the shaft 70 and receiving a nut 76 to rigidly secure the rod 26 to the shaft 70. It will be apparent that as the rod 26 is moved up and down, the shaft 70 will be rocked back and forth as the lever 30 is pivoted.

The lever 30 is pivotally supported from the underside of the platform 18 by a lug 78 which receives a shaft 80 which also passes through openings in the lever upright members 72, 74. The other end of the lever 30 underlies a boss 82 (FIG. 8) extending from the bottom of the platform 18 and the boss 82 is received between the two spaced upright members 72, 74 of the lever 30 adjacent a U-shaped rocker plate 84 secured to the two upright members 72, 74.

As can best be seen in FIG. 8, a rod 86 mounted for slidable movement in an opening 88 in the platform 18, passes internally of the boss 82 to engage a base portion 90 of the rocker plate 84. A coil spring 92 surrounding the rod 86 within the boss 82 abuts a retaining ring 94 secured to the rod 86 by a pin 96, thereby biasing the rod 86 downwardly into contact with the base portion 90 of the rocker plate 84.

The upper end of the rod 86 actuates the toggle means 28, previously mentioned. To this end the upper end portion of rod 86 has parallel flat side portions with an opening extending between said side portions in which opening a toggle shaft 98 is received. The toggle shaft 98 is adapted to be moved up and down by the rod 86 to pivot the dies 20, 22, 24 between their bottle contacting and non-bottle contacting positions.

Turning now to the details of construction of the toggle means 28, the latter comprises two upright sections 104, 106 which support three shafts 108, 110, 112 (FIG. 8). The two shafts 108, 110 pivotally support the inside dies 20, 22 respectively while the shaft 112 pivotally supports the outside die 24. Each die 20, 22, 24 has lower extensions 114, 116, 118 respectively each having openings for receiving toggle rods 120, 122, 124 respectively. The toggle rods 120, 122 carry a pair of toggles 126, 128 (FIG. 10) each of which consists of a cylindrical sleeve receiving the respective toggle rod 120, 122 and each having a pair of spaced radial arms 130, the ends of the latter each having an opening for receiving the previously mentioned toggle shaft 98 as best shown in FIG. 10.

It will be apparent from the above description that as the rod 86 is raised and lowered by the action of the lever 30, the toggle arms 130 are rocked to in turn pivot the inner dies 20, 22 between a closed (non-bottle contacting) position (FIG. 11) and an open (bottle contacting) position (FIG. 13) as will be further described.

In order to effect simultaneous pivotal movement of the outside die 24 with the inside dies 20, 22, a pair of links 132, 134 extend between the shaft 120 on the inner die extension 114 and the shaft 124 on the outer die extension 118. Thus, the two shafts 120 and 124 will be operated in unison to effect simultaneously pivotal movement of the inner die 20 and outer die 24. The two inner dies 20, 22 operate in unison as previously explained.

The apparatus heretofore described forms a deflashing station into and out of which the bottles B are conveyed by a conveyor 136 (FIG. 4). The conveyor 136 has a plurality of resilient clips 138 which grasp the bottom of the bottle B and carries the latter in a generally horizontal disposition as shown in FIG. 4. Guide rails 140 are provided to guide and support the opposite end of the bottle B in the deflashing station.

In operation, the drive for the bottle conveyor 136 is synchronized with the drive for the main shaft 34 so that the latter is rocked back and forth each time the conveyor 136 carries a bottle into the deflashing station. When the bottle enters the deflashing station, the dies are in a lowered position (FIG. 4) out of the path of travel of the bottles B as the latter are carried by the conveyor 136. After the conveyor deposits the bottle in the deflashing station, the main shaft is rotated a predetermined number of degrees (e.g. 180°) in a clockwise direction with reference to FIG. 3. As this occurs, the cam gear 32 is rotated and drives the idler gear 36. As the cam gear 32 rotates, its cam roller 40 engages the cam groove 44 in upper cam plate 46 to raise the latter.

FIG. 3 shows the upper cam roller 40 at bottom center and the upper cam plate 46 in its lowest position. FIG. 11 shows the position of the various parts after the cam gear 32 has rotated 90° clockwise. By comparing FIGS. 3 and 11 it will be seen that the cam roller 40 has been displaced 90° clockwise and during such displacement the cam roller 90 has raised the cam plate 46 because of the engagement of the cam roller 40 in the groove 44 in the cam plate 46. As the latter is raised, the rods 14, 16 are also raised and the latter in turn raise the platform 18 on which the dies 20, 22, 24 are carried.

It will be recalled that the cam gear 32 drives the idler gear 36. As the latter rotates, its cam roller 42 engages the cam groove 48 in lower cam plate 50 to raise the latter along with the upper cam plate 46. The lower cam roller 42 is displaced 90° counterclockwise from its FIG. 3 to its FIG. 11 position simultaneously with the displacement of the upper cam roller 90° clockwise from its FIG. 3 to its FIG. 11 position.

It will be observed that in the FIG. 11 position, the cam rollers 40, 42 are disposed in end portions 142, 144 of the respective cam groove 44, 48, such end portions being generally horizontally disposed. As the cam gear 32 and idler gear 36 continue to rotate beyond the FIG. 11 position to displace the cam rollers 40, 42, the latter continue to raise the cam plates 46, 50 and this continues until the respective cam roller 40, 42 passes out of the horizontal end portions 142, 144 of the respective grooves into an arcuate portion 146 in groove 44 and into a straight, slanted section 148 in groove 48. The arcuate portion 146 of groove 44 is constructed and arranged so that its curved centerline has the same radius of displacement as the cam roller 40 about the centerline of main shaft 34. Accordingly, the cam roller 40 will be displaced along the arcuate portion 146 of groove 44 through the positions shown in FIGS. 12 to 14 without effecting vertical displacement of the upper cam plate 46. For this reason the arcuate portion 146 of groove 44 is referred to as the dwell portion of the groove.

As the cam roller 40 continues to be displaced in a clockwise direction from its FIG. 11 position, it will continue to raise the cam plate 46 until it reaches a changeover point or location where the cam roller 40 passes from the horizontal end portion 142 of groove 44 to the arcuate or dwell portion 146. Thus in FIG. 11 the cam plate 46 is one-half way up its path of travel. In FIG. 12, the cam plate 46 is at its maximum raised position having reached this latter position after the cam roller 40 had passed through the change over location previously mentioned. The cam plate 46 will remain in its maximum raised position as the cam roller 40 is displaced in the arcuate portion 146 of groove 44 from the FIG. 12 to the FIG. 13 position and from the latter to the FIG. 14 position.

When the cam roller 40 passes through the changeover point from the horizontal portion 142 to the arcuate or dwell portion 146 of groove 44, the lower cam roller 42 also passes through a changeover point from the horizontal portion 144 to the straight, slanted portion 148 of groove 48. When the cam roller 42 starts to be displaced along the slanted groove portion 148, the lower cam plate 50 is lowered relative to the upper cam plate 46. The slanted groove portion 148 may be disposed at a 45° angle. Accordingly, since the upper cam roller 40 is displaced along the dwell portion 146 of groove 44 to maintain upper cam plate 46 stationary when the lower cam roller 42 is displaced along the slanted groove portion 148, it will be apparent that the lower cam plate 50 will be displaced or lowered relative to the stationary upper cam plate 46. As the cam plate 50 is lowered as aforesaid, the rod 26 will be lowered relative to platform 18 to pivot lever 30 counterclockwise about pivot pin 80 as viewed in FIGS. 11-14. Upon being so pivoted, the rod 86 is raised thereby raising toggle rod 98. The radial arms 130 of toggles 126, 128 are connected to toggle rod 98 so that raising of the latter pivots the arms 130 and pulls the toggle rods 120, 122, on which the toggles 126, 128 are mounted, towards one another. The toggle rods 120, 122 pass through the respective extensions 114, 116 of inner dies 20, 22 so that as the toggle rods 120, 122 are pulled towards one another, the inner dies 20, 22 are pivoted about their respective pivot shafts 108, 110, the die 20 being pivoted counterclockwise and the die 22 being pivoted clockwise as viewed in FIGS. 11 to 14. The net result of this pivotal movement is to spread the two inner dies 20, 22, as can be ascertained by comparing the position of the inner dies 20, 22 in FIGS. 11 and 13.

As the toggle rods 120, 122 are pulled towards one another, the toggle rod 120 moves to the right as viewed in FIGS. 11 to 14. The previously described links 132, 134 are connected to toggle rod 120 and also to rod 124, the latter in turn being connected to the lower extension 118 on outer die 24. Accordingly, as the links 132, 134 are moved towards the right, the outer die 24 is pivoted in a counterclockwise direction about pivot support shaft 112.

From the above description it will be seen that the dies 20, 22, 24 are in a closed position, as shown in FIG. 11 for example, when the dies reach their maximum raised position. In the maximum raised position the inner dies 20, 22 are disposed within the handle of the bottle B with the upper ends of the dies 20, 22 disposed slightly above the horizontal centerline of the bottle which is indicated by the numeral 150 in FIGS. 11-14.

The two inner dies 20, 22 together have a cross-sectional configuration substantially symmetrical to the configuration of the handle opening but slightly smaller than the latter when the dies are in their closed non-bottle contacting disposition. When the inner dies 20, 22 are in such closed (FIG. 11) disposition, they will readily pass into the handle opening of the bottle without contacting the flash. After the inner dies 20, 22 have passed into the handle opening and have reached their maximum raised position they are pivoted or opened, as heretofore described, so that they conform to the configuration of the handle opening and contact the flash F around the entire inside of the handle opening.

As the two inner dies 20, 22 are pivoted to their open position, the outer die 24 is simultaneously pivoted to contact an outer centerline portion of the handle as can best be seen in FIG. 7. Electrical leads 152, 154, 156 (FIG. 7) are connected to suitable heating elements in the dies 20, 22, 24 respectively to heat the dies, whereby the heated dies will contact the flash F to soften or melt the latter and press it into or flatten it against the surface of the handle thereby to effect its removal.

Returning to the schematic drawings in FIGS. 12 to 14, FIG. 12 shows the dies 20, 22 approximately one-half way open because the cam roller 42 has moved approximately one half the length of the slanted portion 148 of groove 48. FIG. 13 shows the dies 20, 22 all the way open because the cam roller 42 has completed its displacement along the slanted groove portion 148 and is about to enter an arcuate portion 158. The arcuate groove portion 158 is constructed and arranged so that its curved centerline has the same radius as the radius of displacement of the cam roller 42 about the centerline of idler gear 36. Accordingly, the cam roller 42 will be displaced along the arcuate portion 158 of groove 48 without effecting vertical displacement of the lower cam plate 50. For this reason the arcuate groove portion 158 is also referred to as the dwell portion of the groove 48. As the cam roller 42 is displaced along the arcuate groove portion 158 from the FIG. 13 to the FIG. 14 position, the dies 20, 22, 24 will remain stationary in their maximum open position in which position they will contact the flash F to effect its removal.

After the cam rollers 40, 42 reach the FIG. 14 position, the previously mentioned clockwise rotation of main shaft 34 is halted and the latter is rotated in an opposite, counterclockwise direction the same number of degrees (e.g. 180°) the main shaft 34 was initially rotated in a clockwise direction. As the shaft 34 is rotated counterclockwise, the cam rollers 40, 42 will be displaced to retrace their paths along the respective grooves 44, 48 from the FIG. 14 through to the FIG. 11 positions and thence to the FIG. 3 position. As this occurs, the dies 20, 22, 24 will first be pivoted to their closed, non-bottle contacting position and then lowered to the FIG. 3 position whereby the conveyor may carry the bottle on which the flash has been removed out of the deflashing station and deposit another bottle in the station. The cycle may then be repeated where once again the main shaft 34 commences its clockwise rotation.

As the main shaft is rotated counterclockwise the operation of the apparatus is readily discernable by retracing the previously described operating steps which occurred when the shaft was rotated clockwise. Accordingly, in the interest of avoiding needless repetition, a detailed description of the operational aspects of the second half of the operating cycle is not set forth.

It will be observed in FIG. 14 that the cam rollers 40, 42 are disposed at the 12 o'clock position which position determines the end of the first half of the cycle of operation. Alternatively, the cam roller 40 may be displaced further along the arcuate groove portion 146, for example to the 1 o'clock position, by having the main shaft 34 rotate a greater number of degrees than the previously mentioned 180°. It will be apparent that as the cam roller 40 is displaced from the 12 o'clock position (FIG. 14) to the 1 o'clock position, the cam roller 42 will be displaced from the 12 o'clock position (FIG. 14) to the 11 o'clock position. Since both of the aforesaid displacements occur along the dwell portions 146, 158 of the two grooves 44, 48 respectively, the platform 18 and dies 20, 22, 24 will remain stationary with the dies in their bottle contacting positions. Accordingly, the net effect of the aforesaid additional displacement is to lengthen the time which the dies are in their bottle contacting position. It will be appreciated therefore that the amount of time which the dies are in contact with the bottle may be readily increased by increasing the degrees of rotation of main shaft 34 in its cycle of operation. This adjustment may be used as necessary to effect maximum efficiency in flash removal considering the variables which may be encountered such as the type of plastic material used in making the bottle and the amount of flash which has to be removed.

The areas of the dies 20, 22, 24 which contact the bottle may be coated with a release material, for example Teflon, to prevent the plastic material of the bottle from sticking and building up upon the dies.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. Apparatus for removing flash material from portions of molded plastic bottles comprising
   support means,
   a plurality of die members pivotally mounted on said support means between a first, non-bottle contacting disposition and a second, bottle contacting disposition, and
   actuating means for displacing said support means between a first and a second location, said actuating means comprising cam operated means having
   a first and a second output element, said first output element displacing said support means between said first and second locations, said second output element operating said dies between said first and second dispositions;
   a first gear element having an eccentrically mounted cam roller;
   a first cam plate having a first groove receiving said cam roller;
   mounting means mounting said first cam plate for straight line reciprocal motion, said first cam plate being connected to said first output element, whereby reciprocal movement of said first cam plate displaces said support means between its first and second locations;
   a second gear element driven by said first gear element, said second gear element having an eccentrically mounted second cam roller; and
   a second cam plate having a second groove receiving said second cam roller, said first and second cam grooves being constructed and arranged to effect displacement of said first and second output elements as the support means are displaced between said first and second locations, said mounting means mounting said first cam plate also mounting said second cam plate for straight line reciprocal motion, said second cam plate being connected to said second output element, whereby reciprocal movement of said second cam plate operates said dies between said first and second dispositions;
   said actuating means being operable to pivot said dies between said first and second dispositions while said support means is in said second location whereby said die members in said second disposition are operable to effect flash removal from the bottle.

2. Apparatus according to claim 1 wherein said first cam groove has an arcuate dwell portion having the same radius as the radius of displacement of said first cam roller, whereby said first cam plate remains stationary as said first cam roller is displaced along said dwell portion of said first cam groove.

3. Apparatus according to claim 2 wherein said second cam groove has a generally straight line portion and an arcuate dwell portion having the same radius as the radius of displacement of said second cam roller, said second cam plate being displaced relative to said stationary first cam plate as said second cam roller is displaced along said straight line portion of said second cam groove and said first cam roller is displaced along said dwell portion of said first cam groove.

4. Apparatus according to claim 3 wherein said relative displacement of said first and second cam plates operates said dies between said first and second dispositions, said first and second cam rollers during a portion of their cycle of operation being simultaneously displaced along the dwell portions of said first and second cam grooves respectively to temporarily hold said dies in said second bottle contacting disposition.

5. Apparatus according to claim 1 wherein said actuating means further comprises a lever pivotally mounted on said support means, said second output element being operable to pivot said lever upon relative movement between said first and second output elements.

6. Apparatus according to claim 5 wherein said actuating means further comprises toggle means operatively connected to said dies, and a toggle rod operated by said lever to effect operation of said toggle means to operate said dies between said first and second positions.

7. Apparatus according to claim 6 wherein said die elements comprise a pair of inner die members adapted to be inserted within a handle opening in said bottle to remove flash from the inside of the handle and an outer die member adapted to contact an external handle portion of the bottle, said toggle means being operable to pivot said inner die members from said first disposition wherein the inner die members may readily enter the handle opening to said second disposition wherein the inner die members are pivoted to contact the inside of the handle, said toggle means also being operable to pivot said outer die member between said first and second dispositions into and out of contact with the bottle.

8. Apparatus according to claim 7 wherein one of said inner die members is pivoted in one pivotal direction and said other inner die member is pivoted in an opposite pivotal direction.

9. Apparatus according to claim 1 wherein said bottle contacting portion of said die members are coated with a release coating to prevent the plastic material of the bottle from sticking to the die members.

11. Apparatus according to claim 7 wherein said inner die members together have a cross-sectional configuration symmetrical to the configuration of the opening in the handle of the bottle.

10. Apparatus according to claim 1 wherein means are provided to heat said die members.

12. Apparatus according to claim 7 wherein said outer die has a cross-sectional configuration symmetrical to the configuration of the outside of the handle of the bottle.

* * * * *